US012296340B2

(12) United States Patent
Friend et al.

(10) Patent No.: US 12,296,340 B2
(45) Date of Patent: May 13, 2025

(54) OMNIDIRECTIONAL SPIRAL SURFACE ACOUSTIC WAVE GENERATION

(71) Applicant: The Regents of the University of California, Oakland, CA (US)

(72) Inventors: James Friend, San Diego, CA (US); Jiyang Mei, San Diego, CA (US); Gopesh Tilvawala, San Diego, CA (US); Naiqing Zhang, San Diego, CA (US)

(73) Assignee: The Regents of the University of California, Oakland, CA (US)

( * ) Notice: Subject to any disclaimer, the term of this patent is extended or adjusted under 35 U.S.C. 154(b) by 789 days.

(21) Appl. No.: 17/611,096

(22) PCT Filed: May 15, 2020

(86) PCT No.: PCT/US2020/033110
§ 371 (c)(1),
(2) Date: Nov. 12, 2021

(87) PCT Pub. No.: WO2020/232348
PCT Pub. Date: Nov. 19, 2020

(65) Prior Publication Data
US 2022/0250072 A1      Aug. 11, 2022

Related U.S. Application Data

(60) Provisional application No. 62/848,427, filed on May 15, 2019.

(51) Int. Cl.
*B01L 3/00* (2006.01)
*B06B 1/06* (2006.01)
*G01N 1/40* (2006.01)

(52) U.S. Cl.
CPC ... *B01L 3/502761* (2013.01); *B01L 3/502715* (2013.01); *B06B 1/0651* (2013.01);
(Continued)

(58) Field of Classification Search
CPC ......... B01L 3/502761; B01L 3/502715; B01L 2200/0652; B01L 2300/0851;
(Continued)

(56) References Cited

U.S. PATENT DOCUMENTS

2005/0266478 A1* 12/2005 Huang .............. B01L 3/502792
438/1
2013/0046230 A1    2/2013 Lewis, Jr. et al.
(Continued)

FOREIGN PATENT DOCUMENTS

WO    WO-2017084012 A1    5/2017

OTHER PUBLICATIONS

Bourquin, Y. et al., "Rare-Cell Enrichment by a Rapid, Label-Free, Ultrasonic Isopycnic Technique for Medical Diagnostic," Angewandte Chemie International Edition, 2014, 53, 5587-5590.
(Continued)

*Primary Examiner* — Jill A Warden
*Assistant Examiner* — Michael Stanley Gzybowski
(74) *Attorney, Agent, or Firm* — Mintz Levin Cohn Ferris Glovsky and Popeo, P.C.

(57) ABSTRACT

Articles of manufacture, including an apparatus for omnidirectional spiral surface acoustic wave generation, are provided. An acoustic wave device that generates a plurality of acoustic wave includes a piezoelectric material to convert electric energy into the plurality of acoustic waves. The acoustic wave device also includes a transducer. The transducer includes a plurality of fingers arranged in a spiral formation. The plurality of acoustic waves induce acoustic streaming along the piezoelectric material in multiple direc-
(Continued)

tions to isolate a fluid component within a fluid located on the acoustic wave device.

18 Claims, 8 Drawing Sheets

(52) U.S. Cl.
CPC .... *G01N 1/4077* (2013.01); *B01L 2200/0652* (2013.01); *B01L 2300/0851* (2013.01); *B01L 2400/0436* (2013.01); *B01L 2400/0439* (2013.01); *B06B 2201/77* (2013.01); *G01N 2001/4094* (2013.01)

(58) Field of Classification Search
CPC ..... B01L 2400/0436; B01L 2400/0439; B06B 1/0651; B06B 2201/77; G01N 1/4077; G01N 2001/4094
See application file for complete search history.

(56) References Cited

U.S. PATENT DOCUMENTS

| | | | | |
|---|---|---|---|---|
| 2018/0298371 | A1* | 10/2018 | Lipkens | G01N 15/1484 |
| 2019/0091683 | A1 | 3/2019 | Baudoin et al. | |

OTHER PUBLICATIONS

Campbell, C. "Surface acoustic wave devices for mobile and wireless communication," Academic press, 1998.
Collignon, S. et al., "Improving and predicting fluid atomization via hysteresis-free thickness vibration of lithium niobate," Advanced Functional Materials, vol. 28, No. 1704359, 2018.
Connacher, W. et al., "Micro/nano acoustofluidics: materials, phenomena, design, devices, and applications," Lab on a Chip, 2018.
Dentry, M. B. et al., "Frequency effects on the scale and behavior of acoustic streaming," Physical Review E, 2014, 89, 013203.
Destgeer, G. et al., "Acousticfluidic particle manipulation inside a sessile droplet: four distinct regimes of particle concentration," Lab on a Chip, 2016, 16, 660-667.
Destgeer, G. et al., "Continuous separation of particles in a PDMS microfluidic channel via travelling surface acoustic waves (TSAW)," Lab on a Chip 2013, 13, 4210-4216.
Ding, X. et al., "Surface acoustic wave microfluidics," Lab on a Chip, 2013, 13, 3626-3649.
Friend, J. et al., "Microscale acoustofluidics: Microfluidics driven via acoustics and ultrasonics," Reviews of Modern Physics, 2011, 83, 647.
Fu, Y. Q. et al., "Advances in piezoelectric thin films for acoustic biosensors, acoustofluidics and lab-on-chip applications," Progress in Materials Science, vol. 89, pp. 31-91, 2017.
Hodgson, R. P. et al., "Transmitting high power rf acoustic radiation via fluid couplantsinto superstrates for microfluidics," Applied Physics Letters, 2009, 94, 024102.
Jo, M. C. et al., "Active density-based separation using standing surface acoustic waves," Sensors and Actuators A: Physical, 2012, 187, 22-28.
Kawamata, A. et al., "Non-hysteresis and perfect linear piezoelectric performance of a multi- layered lithium niobate actuator," Sensors and Actuators A: Physical, vol. 135, No. 2, pp. 782-786, 2007.
King, L. V. "On the Acoustic Radiation Pressure on Spheres," Proc. R. Soc. Lond. A, 1934, 147, 212-240.
Kurosawa, M. et al., "An ultrasonic XY stage using 10 MHz surface acoustic waves," in Ultrasonics Symposium, 1994. Proceedings, 1994 IEEE, vol. 1. IEEE, 1994, pp. 535-538.
Kurosawa, M. et al., "Ultrasonic linear motor using surface acoustic waves," IEEE Trans-actions on Ultrasonics, Ferroelectrics, and Frequency Control, vol. 43, No. 5, pp. 901-906, 1996.

Kwon, J. W. et al., "Directional droplet ejection by nozzleless acoustic ejectors built on ZnO and PZT," Journal of Micromechanics and Microengineering, vol. 16, No. 12, p. 2697, 2006.
Laude, V. et al., "Subwavelength focusing of surface acoustic waves generated by an annular interdigital transducer," Applied Physics Letters, 2008, 92, 094104.
Lee, C.-Y. et al., "Subpico-liter droplet generation based on a nozzle-free acoustic transducer," Applied Physics Letters, vol. 93, No. 3, p. 034104, 2008.
Li, H. et al., "Surface acoustic wave concentration of particle and bioparticle suspensions," Biomedical microdevices, 2007, 9, 647-656.
Lighthill, J. "Acoustic streaming," Journal of sound and vibration, 1978, 61, 391-418.
Lim, T. C. et al., "Search for Forbidden Directions of Elastic Surface-Wave Propagation in Anisotropic Crystals," J. Appl. Phys. 39, 4319 1968, Abstract.
Lin, S.- C. S. et al., "Surface acoustic wave (SAW) acoustophoresis: now and beyond," Lab on a Chip, 2012, 12, 2766-2770.
Ma, Z. et al., "Mechanical Properties Based Particle Separation via Traveling Surface Acoustic Wave," Analytical chemistry, 2016, 88, 11844-11851.
Miansari, M. et al., "Acoustic nanofluidics via room-temperature lithium niobate bonding: A platform for actuation and manipulation of nanoconfined fluids and particles," Advanced Functional Materials, vol. 26, No. 43, pp. 7861-7872, 2016.
Nam, J. et al., "Density-dependent separation of encapsulated cells in a microfluidic channel by using a standing surface acoustic wave," Biomicrofluidics, 2012, 6, 024120.
Nam, J. et al., "Separation of platelets from whole blood using standing surface acoustic waves in a microchannel," Lab on a Chip, 2011, 11, 3361-3364.
Rogers, P. R. et al., "Exploitation of surface acoustic waves to drive size-dependent microparticle concentration within a droplet," Lab on a Chip, 2010, 10, 2979-2985.
Setter, N. et al., "Ferroelectric thin films: Review of materials, properties, and applications," Journal of Applied Physics, vol. 100, No. 5, p. 051606, 2006.
Shi, J. et al., "Continuous particle separation in a microfluidic channel via standing surface acoustic waves (SSAW)," Lab on a Chip, 2009, 9, 3354-3359.
Shibayama, K. et al., "Optimum cut for rotated Y-cut LiNbO3 crystal used as the substrate of acoustic-surface-wave filters," Proceedings of the IEEE, vol. 64, No. 5, pp. 595-597, 1976.
Shields, C. W. IV et al., "Microfluidic cell sorting: a review of the advances in the separation of cells from debulking to rare cell isolation," Lab on a Chip, 2015, 15, 1230-1249.
Shilton, R. et al., "Particle concentration and mixing in microdrops driven by focused surface acoustic waves," Journal of Applied Physics, 2008, 104, 014910.
Slobodnik, A., Jr. et al., "Microwave acoustics handbook. vol. 1. surface wave velocities." Air Force Cambridge Research Labs Hanscom AFB MA, Tech. Rep., 1970.
Tiersten, H. F. "Wave propagation in an infinite electric plate," The Journal of the Acoustical Society of America, vol. 35, No. 2, pp. 234-239, 1963.
Uchida, T. et al., "Investigation of acoustic streaming excited by surface acoustic waves," Ultrasonics Symposium, 1995. Proceedings, 1995 IEEE, 1995, pp. 1081-1084.
Weis, R. et al., "Lithium niobate: summary of physical properties and crystal structure," Applied Physics A, vol. 37, No. 4, pp. 191-203, 1985.
Xu, S. et al., "One-dimensional ZnO nanostructures: solution growth and functional properties," Nano Research, vol. 4, No. 11, pp. 1013-1098, 2011.
Yamanouchi, K. et al., "Propagation and amplification of Rayleigh waves and piezoelectric leaky surface waves in LiNbO3," Journal of Applied Physics, vol. 43, No. 3, pp. 856-862, 1972.
Yeo, L. Y. et al., "Microfluidic Devices for Bioapplications," small, 2011, 7, 12-48.
Yeo, L. Y. et al., "Surface Acoustic Wave Microfluidics," Annual review of fluid mechanics, 2014, 46, 379-406.

(56) References Cited

OTHER PUBLICATIONS

Yeo, L. Y. et al., "Ultrafast microfluidics using surface acoustic waves," Biomicrofluidics, 2009, 3, 012002.
Yu, H. et al., "Liquid needle," Journal of microelectromechanical systems, vol. 16, No. 2, pp. 445-453, 2007.
Zhang, G.-Q. et al., "Liquid streaming by high-frequency ultrasonic waves," Japanese Journal of Applied Physics, vol. 35, No. 5S, p. 3248, 1996.
International Search Report and Written Opinion issued in International Application No. PCT/2020/033100, mailed Aug. 17, 2020, (Aug. 17, 2020). 9 pages.

* cited by examiner

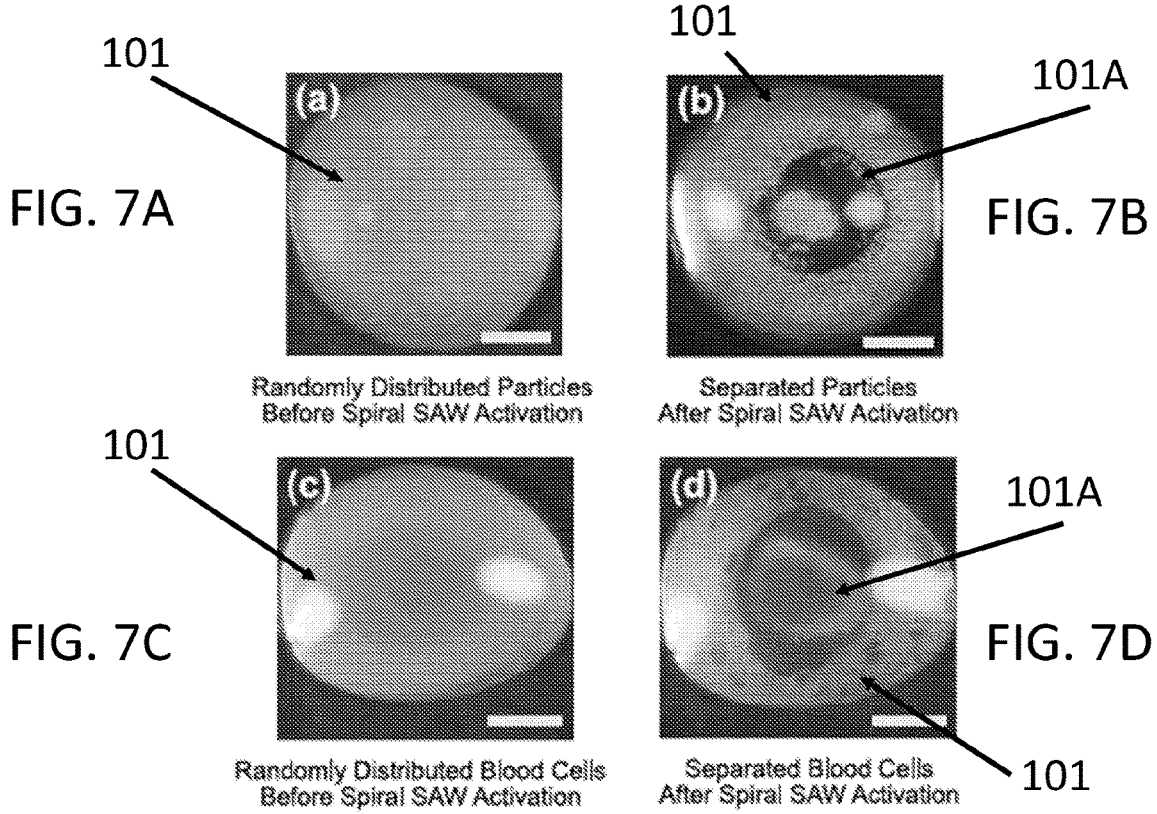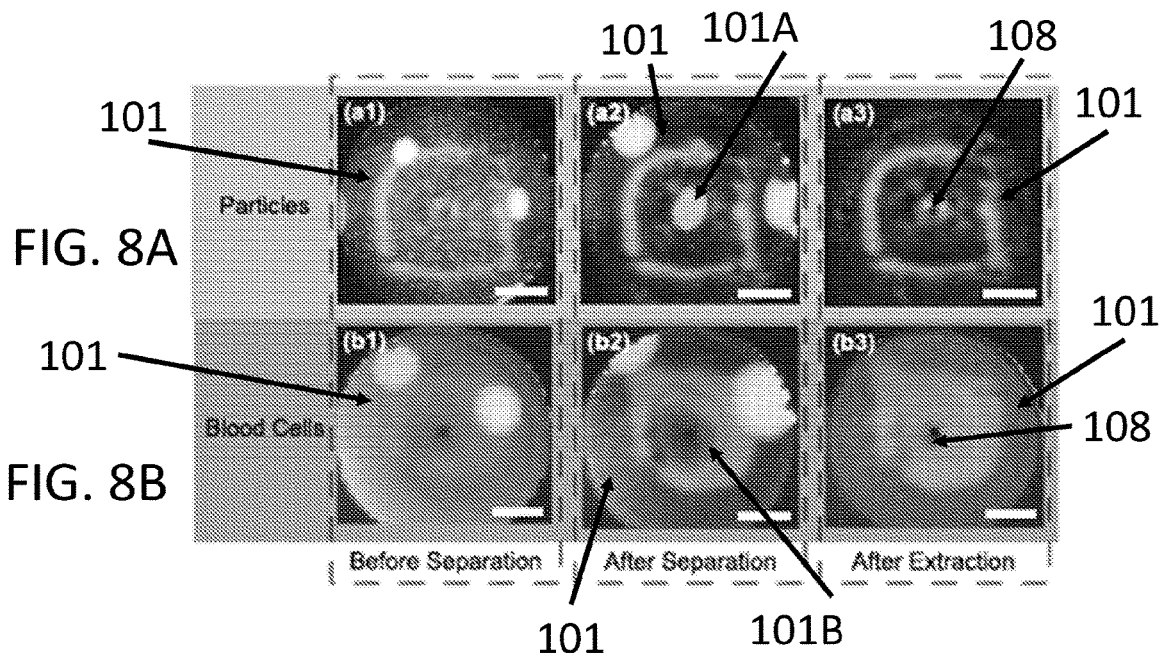

OMNIDIRECTIONAL SPIRAL SURFACE ACOUSTIC WAVE GENERATION

CROSS-REFERENCE TO RELATED APPLICATIONS

This application is a national stage entry of International Application No. PCT/US2020/033110, filed on May 15, 2020, and entitled, "OMNIDIRECTIONAL SPIRAL SURFACE ACOUSTIC WAVE GENERATION," which claims priority to U.S. Provisional Patent Application No. 62/848,427, filed on May 15, 2019, and entitled "OMNIDIRECTIONAL SPIRAL SURFACE ACOUSTIC WAVES FOR SEPARATION AND EXTRACTION OF MULTI-SIZE PARTICLES AND RED BLOOD CELLS IN A MICROLITER SESSILE DROP," the disclosure of each of which is incorporated herein by reference in its entirety.

TECHNICAL FIELD

The subject matter described herein relates generally to surface acoustic wave technology and more specifically to an omnidirectional spiral surface acoustic wave device.

BACKGROUND

Surface acoustic waves ("SAWs") are relatively high-frequency, short-wavelength acoustic waves that offer large accelerations convenient for efficient fluid-structural coupling. SAWs may be used in a variety of micro- to nano-scale acoustofluidic applications, such as fluid manipulation, particle and cell sorting and separation, fluid jetting, and atomization due to its rapid fluid actuation, biocompatibility, and simple operating procedures. Straight interdigital transducers ("IDT") with a sessile drop located at an offset position from the center of the SAW propagation direction may be used for fluid spinning, particle concentration, and separation due to its asymmetric SAW actuation properties.

SUMMARY

Articles of manufacture, including apparatuses, and methods for omnidirectional spiral surface acoustic wave generation are provided.

According to some aspects, articles of manufacture, including an apparatus for omnidirectional spiral surface acoustic wave generation, are provided. An acoustic wave device that generates a plurality of acoustic wave may include a piezoelectric material configured to convert electric energy into the plurality of acoustic waves. The acoustic wave device also may include a transducer. The transducer may include a plurality of fingers arranged in a spiral formation. The plurality of acoustic waves may induce acoustic streaming along the piezoelectric material in multiple directions to isolate a fluid component within a fluid located on the acoustic wave device.

In some aspects, the acoustic wave device propagates the plurality of acoustic waves in a direction that is perpendicular to a tangent of each finger of the plurality of fingers.

In some aspects, the spiral formation comprises a circular array of the plurality of fingers.

In some aspects, the piezoelectric material comprises lithium niobate (LN). The LN may include a Y-rotated cut angle of 151.5 degrees to 152.5 degrees. The LN may include a Y-rotated cut angle of 140 degrees to 160 degrees.

In some aspects, each of the fingers of the plurality of fingers are curved from a periphery towards a central region of the transducer.

In some aspects, each of the fingers of the plurality of fingers face a single direction.

In some aspects, the transducer comprises an interdigital transducer.

In some aspects, the piezoelectric material includes a hole through which the isolated fluid component is configured to be extracted via an extraction system. The extraction system may include an extractor and a capillary tube.

In some aspects, the fluid component comprises one or more of a particle, a platelet, and a blood cell.

In some aspects, the fluid component comprises a large fluid component and a small fluid component. The plurality of acoustic waves may cause the large fluid component to be located towards a center of the fluid and the small fluid component to be located towards the periphery of the fluid.

In some aspects, 50 milliwatts to 5.0 watts of electric power is applied to the piezoelectric material in order to cause the acoustic wave device to generate the plurality of acoustic waves.

According to some aspects, a method is provided for omnidirectional spiral surface acoustic wave generation. For example, the method may include generating, by an acoustic wave device, a plurality of acoustic waves in multiple directions to a fluid droplet positioned on the acoustic wave device. The acoustic wave device may include a piezoelectric material that may convert electric energy into the plurality of acoustic waves. The acoustic wave device may also include a transducer. The transducer may include a plurality of fingers arranged in a spiral formation. The plurality of acoustic waves may induce acoustic streaming along the piezoelectric material in multiple directions to isolate a fluid component within a fluid on acoustic wave device.

In some aspects, the method may also include extracting, via an extraction system, the one or more isolated fluid components from the fluid.

In some aspects, the extractor system comprises a syringe and a capillary tube to draw the isolated fluid component.

In some aspects, the method also includes propagating the plurality of acoustic waves in a direction that is perpendicular to a tangent of each finger of the plurality of fingers.

In some aspects, the fluid component comprises a large fluid component and a small fluid component. In some aspects, the method also includes causing the large fluid component to be located towards a center of the fluid and the small fluid component to be located towards the periphery of the fluid.

In some aspects, the plurality of fingers connect to a central point in a central region of the spiral formation such that the fluid is placed directly over at least a portion of the plurality of fingers.

In some aspects, the plurality of fingers are covered with a thin layer of a non-conductive material to prevent short-circuiting of the transducer while enabling direct coupling into the fluid. The fluid may be placed directly over the plurality of fingers.

In some aspects, the plurality of fingers may narrow down to sub-micrometer widths and operate at gigahertz frequencies coupling into the fluid placed directly over the plurality of fingers.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to a rechargeable battery, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 7A depicts an image showing randomly distributed particles in a fluid before spiral surface acoustic wave activation, consistent with implementations of the current subject matter;

FIG. 7B depicts an image showing separated particles in a fluid after spiral surface acoustic wave activation, consistent with implementations of the current subject matter;

FIG. 7C depicts an image showing randomly distributed blood cells in a fluid before spiral surface acoustic wave activation, consistent with implementations of the current subject matter;

FIG. 7D depicts an image showing separated blood cells in a fluid after spiral surface acoustic wave activation, consistent with implementations of the current subject matter;

FIG. 8A depicts images showing a sequence of particles in a fluid before spiral surface acoustic wave activation, after spiral surface acoustic wave activation, and after extraction of the particles, consistent with implementations of the current subject matter;

FIG. 8B depicts images showing a sequence of blood cells in a fluid before spiral surface acoustic wave activation, after spiral surface acoustic wave activation, and after extraction of the blood cells, consistent with implementations of the current subject matter;

When practical, similar reference numbers denote similar structures, features, and/or elements.

DETAILED DESCRIPTION

Figure 1:
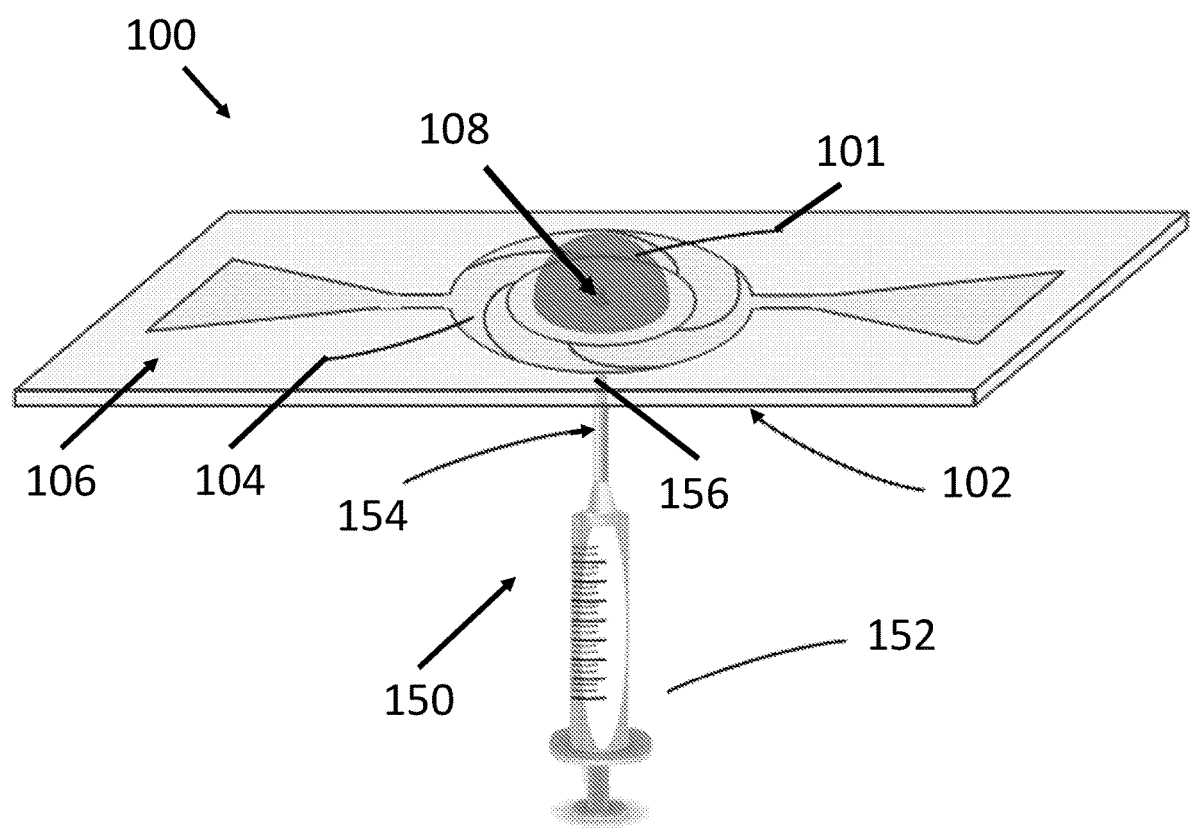
FIG. 1 depicts a surface acoustic wave system for omnidirectional spiral surface acoustic wave generation, consistent with implementations of the current subject matter.

Surface acoustic waves ("SAWs") are relatively high-frequency, short-wavelength acoustic waves that offer large accelerations convenient for efficient fluid-structural coupling, and have been used in a variety of micro to nano-scale acoustofluidic and biomedical applications. For example, SAWs have been used for fluid manipulation, particle and cell sorting and separation, and fluid jetting and atomization due to its rapid fluid actuation, biocompatibility, and simple operating procedures. Also, SAW-based separation in enclosed channels has been used due to its high throughput and sample-continuity.

Traveling surface acoustic wave ("TSAW") generation and standing acoustic wave ("SSAW") generation have both been used to continuously separate particles and cells based on their sizes and mechanical properties. However, the need for a microchannel fabrication process and a syringe pump in most cases to complete the separation complicates those systems and renders their use in a clinical setting problematic.

In some instances, straight interdigital transducers ("IDTs") with a sessile drop located at an offset position from the center of the SAW propagation direction are used for fluid spinning, particle concentration, and separation due to its asymmetric SAW actuation properties. However, anisotropic substrates, difficulty in repeatedly and accurately placing sessile drops, and large SAW energy losses because of the offset position impede its efficiency, accuracy, and repeatability. The system described herein includes an axisymmetric omnidirectional spiral surface acoustic wave ("OSSAW") device for efficient transfer of energy from all directions into an accurately located sessile drop.

Moreover, IDTs may be used to enhance the intensity of SAW actuation for more efficient fluid spinning and particle concentration in a sessile drop. But such configurations are still asymmetric and have significant SAW energy losses because of the offset position. An annular IDT may generate focusing SAWs from all directions to a single, diffraction-limited spot. However, such annular IDTs focus energy to one spot at the center of the SAW transducer, without generating the necessary asymmetry to generate fluid spinning in the droplet and consequent particle separation. Consistent with implementations of the current subject matter, the system described herein includes a rotationally symmetric design and spiral formation that generates SAWs from all directions for rapid fluid spinning and particle separation in an accurately located sessile droplet. The SAWs generated by the system described herein propagate inwards from all directions, converging tangentially to a circle of defined diameter to produce a net moment. The system described herein includes an axisymmetric, OSSAW design for efficient fluid spinning and multi-size particle separation, such as in a microliter sessile drop. The system described herein may additionally and/or alternatively provide an OSSAW-enabled platform for selective extraction of particles (e.g., particles and/or cells of a specific size, type, density, and/or the like). For example, the system described herein may be used for rapid cell separation and extraction from pin-prick samples of blood for point-of-care diagnostics.

Additionally, true separation of particles and after, extracting the separated particles is difficult. However, for many point-of-care diagnostics and biomedical applications, further analysis and integrated tests of separated samples are necessary. The system described herein may be used to target specific particles within a fluid, such as particular platelets from whole blood, for integrated point-of-care diagnostics, and to efficiently extract the separated target particles. Thus, the system described herein provides an effective platform for whole blood separation and point-of-care diagnostics without the need for micro or nanoscale fluidic enclosures.

SAWs have generally been generated and propagated within and/or on a substrate including a piezoelectric material. For example, microscale acoustofluid actuation, such as use of the OSSAW device described herein, relies on a piezoelectric effect, which generates electric charge upon application of mechanical stress in certain materials. The piezoelectric materials can therefore act as electromechanical transducers that propagate the generated SAWs. When traveling in and/or along a piezoelectric material, SAWs can produce surface displacement up to 1 mm at a high frequency, which leads to large acceleration to rapidly spin a fluid to separate and extract one or more particles of the fluid.

Generally, substrates used in SAW devices include quartz, lithium tantalite (LT) $LiTaO_3$, lithium niobate (LN) $LiNbO_3$, gallium arsenide (GaAs), cadmium sulfide (CdS), zinc oxide (ZnO), lithium tetraborate ($LI_2B_4O_7$), lanthanum gallium silicate ($La_3Ga_3SiO_{12}$), and/or the like. Due to the crystalline structure of these materials, the type and/or direction of the generated SAWs is dependent on the properties of the substrate, such as the type of material and the orientation of the substrate.

Lithium niobate has generally been used as the material of the substrate for SAW devices requiring high efficiency, as the material possesses a relatively large electromechanical coupling coefficient. As an example, SAWs may be propagated along only a single direction (e.g., along an x-axis) using a single crystal 127.86 degree Y-rotated X-propagating cut of LN ($LiNbO_3$) substrate, referred to herein as the "128YX LN cut." This cut may be used in microfluidic devices because it provides large mechanical displacements in the substrate. However, the 128YX LN cut generates SAWs along only the X-direction, which may be ideal for telecommunications systems, but problematic in acoustofluidics, in which it would be beneficial for SAWs to be propagated along multiple directions to avoid obstacles, deflect into features, and produce multi-dimensional acoustic wave structures. The OSSAW system described herein desirably propagates SAWs along multiple directions.

Additionally, any SAW generated at an angle relative to the X-axis propagation direction may encounter beam steering and a reduction in electromechanical coupling, reducing the efficiency and effectiveness of SAW generation in separating particles from a fluid. Moreover, since the SAW propagation velocity would change if the SAW is generated at an angle relative to the X-axis propagation direction, either the frequency must change to deliver a SAW of the same wavelength or the generating electrode dimensions must be carefully tailored to deliver SAW at a constant frequency. With similarly sized electrodes and driving conditions upon the 128YX LN cut, the vibration displacement and particle velocity of a SAW along the X-axis would undesirably double these values for SAWs along the Y-axis (or another axis, such as the Z-axis) due to the significant difference in electromechanical coupling along these propagation directions. Thus, the 128YX LN cut may reduce the utility of LN in many applications where more diverse configurations are necessary, such as in inducing particle separation in sessile drops.

Consistent with implementations of the current subject matter, the devices described herein pertain to an optimized Y-rotated cut of LN to enable multi-directional SAW propagation. For example, the OSSAW device described herein includes a piezoelectric material for multi-directional SAW propagation to minimize in-plane anisotropy and maximize in-plane electromechanical coupling. In other words, the piezoelectric material described herein has minimized anisotropic in-plane properties that are similar to isotropic properties along the surface plane of the substrate. For example, the piezoelectric material described herein may desirably include a 152 degree Y-axis rotated cut of LN (or Y-rotated cut angles of approximately 140 degrees to 145 degrees, 140 degrees to 150 degrees, 145 degrees to 150 degrees, 150 degrees to 155 degrees, 155 degrees to 160 degrees, 160 degrees to 165 degrees, 145 degrees to 155 degrees, 151 degrees to 153 degrees, 151.5 degrees to 152.5 degrees,), which propagates the SAWs in multiple directions (beyond the standard X-axis of the 128YX LN cut), minimizes in-plane anisotropic properties, and maximizes in-plane electromechanical coupling properties of the piezoelectric material. Additionally and/or alternatively, the OSSAW device described herein provides a consistent method for tailoring the selection of the substrate cut to fit desired design goals.

FIG. 1 illustrates an example of a SAW system 100, consistent with implementations of the current subject matter. The SAW system 100 may include a SAW device 102, such as an OSSAW device, and an extractor system 150. The OSSAW device 102 may include a transducer 104, such as an IDT, and a substrate 106. The OSSAW device 102 may be configured to operate at 40 to 100 megahertz, 100 to 150 megahertz, 5 to 150 megahertz, 5 megahertz or greater, 150 megahertz or greater, or a different frequency. The extractor system 150 may include an extractor 152, such as a syringe, a pump, or other fluid collector, a capillary tube 154, and/or a fluid connector 156. The extractor system 150 may be permanently and/or removably coupled to the OSSAW device 102.

The SAW system 100 may be used to perform true size-based separation and isolation of particles and/or blood components from the center of a fluid droplet applied to the OSSAW device 102 for further analytical and biological analysis. Additionally and/or alternatively, the SAW system 100 may be used to extract the separated fluid components of the particles and/or blood components for further analytical and biological analysis. For example, the OSSAW device 102 (e.g., the substrate 106 and/or the transducer 104) may receive a droplet (e.g., a sessile droplet) and/or another volume of a fluid 101, such 1 microliter, 0.25 to 0.5 microliters, 0.5 to 0.75 microliters, 0.75 to 1.0 microliters, 1.0 to 1.25 microliters, 1.25 to 1.5 microliters or more. Though certain embodiments described herein relate to the separation and/or extraction of a particular fluid component (e.g., particles and/or blood cells) from a particular liquid (e.g., water, a saline solution, blood), the SAW system 100 and its components may be used for separation and/or extraction of one or more fluid components and/or sized-fluid components, such as one or more liquid components, solid components, particles, blood cells, suspensions of fluid, colloids, red blood cells, platelets, dust, pollen, anthrax, and/or the like from a fluid, such as water, a saline solution, whole blood, and/or the like.

Referring to FIG. 1, the substrate 106 may include a hole 108. The hole 108 may extend through a thickness of the substrate 106. The hole 108 may be positioned at a center of the substrate 106 and/or the transducer 104. In some implementations, the substrate 106 includes a plurality of holes 108, such as an array of holes 108, each positioned at the center of a transducer 104, and/or along various portions of the substrate 106. The hole 108 may be configured to be positioned beneath a center of the fluid droplet to allow the separated particles to be extracted through the hole 108 after separation. The hole 108 may also be positioned beneath various portions of the fluid droplet to allow for various sized particles to be extracted through each hole 108. The hole may include a diameter of approximately 100 μm. In other implementations, the hole has a diameter of approximately 25 to 100 μm, 100 to 150 μm, 150 to 200 μm, or larger. The hole 108 may be sized to allow all or some of the fluid, such as the separated fluid component to be extracted there through. In some implementations, the hole 108 is sized to allow only the separated fluid component to be extracted there through and/or prevent at least some of the remaining fluid to pass through the hole 108. In some implementations the hole 108 is drilled at the center of the OSSAW device 102 using laser machinery.

The extractor system 150 may be coupled to the hole 108. For example, the extractor system 150 may be positioned on either side of the hole 108 to extract the separated particles from the fluid. In the example illustrated in FIG. 1, for example, the extractor system 150 is positioned beneath the OSSAW device 102. The extractor system 150 includes the extractor 152, such as a syringe or other fluid collector, a capillary tube 154, and/or a fluid connector 156. The fluid connector 156 may include a luer, luer lock, and/or the like. The fluid connector 156 may be coupled to the hole 108 and/or the substrate 106 surrounding the hole 108.

The fluid connector 156 may be coupled to the substrate 106 at one end and a capillary tube 154 at an opposite end, which may be connected to the extractor 152. For example, the capillary tube 154 may include a glass tube. The capillary tube 154 may have a diameter that is small enough to draw, via capillary pressure exerted on the fluid by the walls of the capillary tube 154, the separated particles through the hole 108 and/or the fluid connector 156 into the extractor 152. In some implementations, the extractor 152 is manipulated, withdrawn, and/or the like to draw the separated particles from the fluid. In some implementations, the extractor 152 and/or the capillary tube 154 may be directly coupled to the substrate 106 and/or the hole 108 to draw the separated particles from the fluid deposited on the substrate 106. The capillary tube 154 may have a diameter of approximately 50 to 80 μm, 25 to 100 μm, 100 to 150 μm, 150 to 200 μm, or larger. The capillary tube 154 may be desirably sized to allow all or some of the fluid, such as the separated fluid component to be extracted through the capillary tube, such as via capillary action. For example, the capillary tube 154 is sized to maintain a sufficient capillary pressure on the extracted fluid component to extract the fluid component. In some implementations, the capillary tube 154 is sized to allow only the separated fluid component to be extracted there through and/or prevent at least some of the remaining fluid to pass through the hole 108.

In some implementations, the extractor 152, the capillary tube 154, and/or the fluid connector 156 are secured to one another and/or the substrate 106 via one or more adhesives, mechanical fasteners, and/or the like. Additionally and/or alternatively, the extractor 152, the capillary tube 154, and/or the fluid connector 156 are secured to one another and/or the substrate 106 after separation of the particles from the fluid deposited on the substrate 106. Accordingly, the separated particles may desirably be efficiently and effectively extracted by the extractor system 150 of the SAW system 100 for further analysis.

Additionally and/or alternatively, the extractor system 150 may include one or more magnets to magnetically extract the separated particles from the fluid 101. For example, magnetic micro-scale particles may be introduced to the fluid (e.g., the blood, water, and/or the like), which bind to a target virus, bacteria, or other component of the fluid. The magnet of the extractor system 150 may be used to magnetically attract to the bound magnetic particles and target component to extract the targeted component from the fluid.

Referring to FIG. 1, the SAW device 100 may include an OSSAW device, which includes a transducer 104, such as an IDT or interdigitated electrode pattern, having a spiral formation 110. The transducer 104 may convert electrical energy received from a power source into mechanical energy to generate and/or detect SAWs. The transducer 104 may be deposited onto the substrate 106, coupled to the substrate 106, etched onto the substrate 106, and/or formed as part of the substrate 106. The spiral formation of the transducer 104 generates rotational symmetric SAWs in a circular region so that energy can be efficiently transferred into the fluid droplet for improved fluid spinning and particle and/or cell separation.

The substrate 106 may include a piezoelectric material to convert electric energy into a plurality of acoustic waves. The piezoelectric material may include a monocrystalline (e.g., lithium niobate, quartz, lithium tantalate, langasite, and/or the like), a polycrystalline (e.g., ceramic and/or the like), one or more layers of the monocrystalline and/or polycrystalline material, and/or the like. As such, the OSSAW device 102 may generate the plurality of acoustic waves as a response to being subject to an electric field. For example, the OSSAW device 102 may generate a plurality of acoustic waves when the piezoelectric material included in the OSSAW device 102 converts electric energy into mechanical energy in the form of acoustic waves such as, for example, surface acoustic waves, Lamb waves, flexural waves, thickness mode vibrations, mixed-mode waves, longitudinal waves, shear mode vibrations, bulk wave vibrations, and/or the like. The plurality of acoustic waves generated by the SAW device may be delivered to the one or more fluid droplets positioned on the substrate 106 to enable the transmission of ultrasonic energy such as, for example, the acoustic waves and/or the like. In order to cause the acoustic wave device to generate the plurality of acoustic waves, between 50 milliwatts to 5.0 watts of electric power may be applied to the acoustic wave device, although other amounts of power may be applied as well.

Consistent with implementations of the current subject matter, the substrate 106 desirably allows for multi-directional SAW propagation. For example, the OSSAW device 102 described herein includes a piezoelectric material for multi-directional SAW propagation to minimize in-plane anisotropy and maximize in-plane electromechanical coupling. In other words, the piezoelectric material of the substrate 106 described herein has minimized anisotropic in-plane properties that are similar to isotropic properties along the surface plane of the substrate. Generally, materials having isotropic properties are desirable, as the material would have properties that do not vary in magnitude when measured in different directions. However, these materials are unable to offer piezoelectricity, which increases mechanical coupling properties and helps to generate the acoustic waves. On the other hand, piezoelectric materials are generally anisotropic, which results in properties that vary in magnitude when measured in different directions. This may not be desirable in SAW generation, as it may be difficult to propagate the acoustic waves to the fluid droplets described herein. The substrate 106 described herein balances the properties of the piezoelectric material by minimizing in-plane anisotropy and maximizing in-plane electromechanical coupling.

For example, the piezoelectric material of the substrate 106 may desirably include a 152 degree Y-axis rotated cut of LN (or other desirable sizes as described herein, such as the Y-rotated cut angle of the substrate being approximately 140 degrees to 145 degrees, 140 degrees to 150 degrees, 145 degrees to 150 degrees, 150 degrees to 155 degrees, 155 degrees to 160 degrees, 160 degrees to 165 degrees, 145 degrees to 155 degrees, 151 degrees to 153 degrees, 151.5 degrees to 152.5 degrees,) (referred to herein as a "152YX LN cut") or another material, which propagates the SAWs in multiple directions (beyond the standard X-axis of the 128YX LN cut), and minimizes in-plane anisotropic properties while maximizing in-plane electromechanical coupling properties of the piezoelectric material. In other words, the Y-rotated cut angle of the substrate 106 (e.g., LN) is approximately 152 degrees. Additionally and/or alternatively, the Y-rotated cut angle of the substrate 106 (e.g., LN) is approximately 140 degrees to 145 degrees, 140 degrees to 150 degrees, 145 degrees to 150 degrees, 150 degrees to 155 degrees, 155 degrees to 160 degrees, 160 degrees to 165 degrees, 145 degrees to 155 degrees, 151 degrees to 153 degrees, 151.5 degrees to 152.5 degrees, 140 degrees to 160 degrees, and/or the like. Unlike the 128YX LN cut substrate, which may be used in SAW generation, but exhibits poor electromechanical coupling of acoustic waves away from single X-axis, the OSSAW device 102 (including the transducer 104 and/or the substrate 106) generates a more intense acoustic streaming and acoustic radiation force by exploiting the electromechanical coupling from all propagation directions towards the fluid (e.g., the fluid 101).

Figure 9:
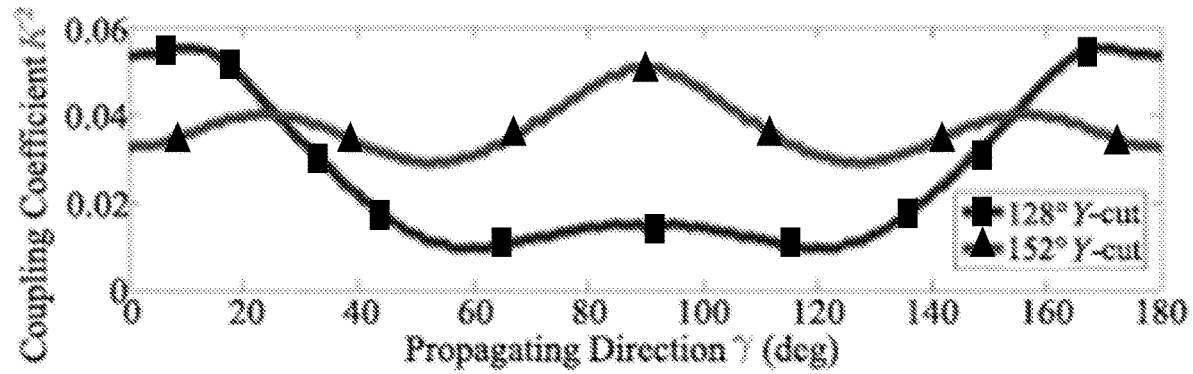
FIG. 9 depicts a graph showing a comparison of substrate materials of a surface acoustic wave device, consistent with implementations of the current subject matter.

FIG. 9 demonstrates the improvement of the substrate 106 including the 152YX LN cut over the 128YX LN cut (among other cuts of LN) in propagating SAWs in multiple directions and/or along multiple axes. For example, FIG. 9 graphically illustrates a comparison of the relationship between the coupling coefficient $K^2$ and a propagating direction γ (in degrees) for a 128YX LN cut and a 152YX cut. As shown in FIG. 9, the coupling coefficient for SAWs propagating upon the 152YX cut is notably larger than the coupling coefficient for SAWs propagating upon the 128YX LN cut over a majority of the propagating directions, such as between γ≈30° and γ≈150°.

Accordingly, based on this comparison, the 152YX LN cut is quantifiably more isotropic than the 128YX LN cut. For example, the standard deviation of the electromechanical coupling coefficient, $K^2$, over the range γ=0° to 180°, using the 152YX cut is 66.5% lower than when using the 128YX LN cut. This indicates an electromechanical coupling coefficient that is more uniform in the 152YX cut and therefore provides at least a 66.5% improvement in the in-plane isotropy for propagating SAWs in multiple directions upon the substrate 106. Furthermore, the average electromechanical coupling coefficient, $K^2$, over γ=0° to 180° in 152YX cut is 37.0% greater than 128YX LN cut, indicating a greater overall ability to produce SAWs in multiple directions, and at least a 37.0% improvement in the average electromechanical coupling when propagating SAWs in multiple directions. Therefore, for omnidirectional surface wave actuation on substrates, a 152YX cut, for example, is significantly both less anisotropic and more electromechanically efficient than the 128YX LN cut, among other Y-rotated substrates. Thus, the 152YX cut (or Y-rotated cut angles of approximately 140 degrees to 145 degrees, 140 degrees to 150 degrees, 145 degrees to 150 degrees, 150 degrees to 155 degrees, 155 degrees to 160 degrees, 160 degrees to 165 degrees, 145 degrees to 155 degrees, 151 degrees to 153 degrees, 151.5 degrees to 152.5 degrees,) offers significant advantages in those applications for which SAW propagation in multiple directions is desirable, such as in biological applications (e.g., separating blood components, such as platelets, from within blood droplets), and/or in other applications when separating particles (e.g., multi-size particles) from within a fluid.

Figure 10:
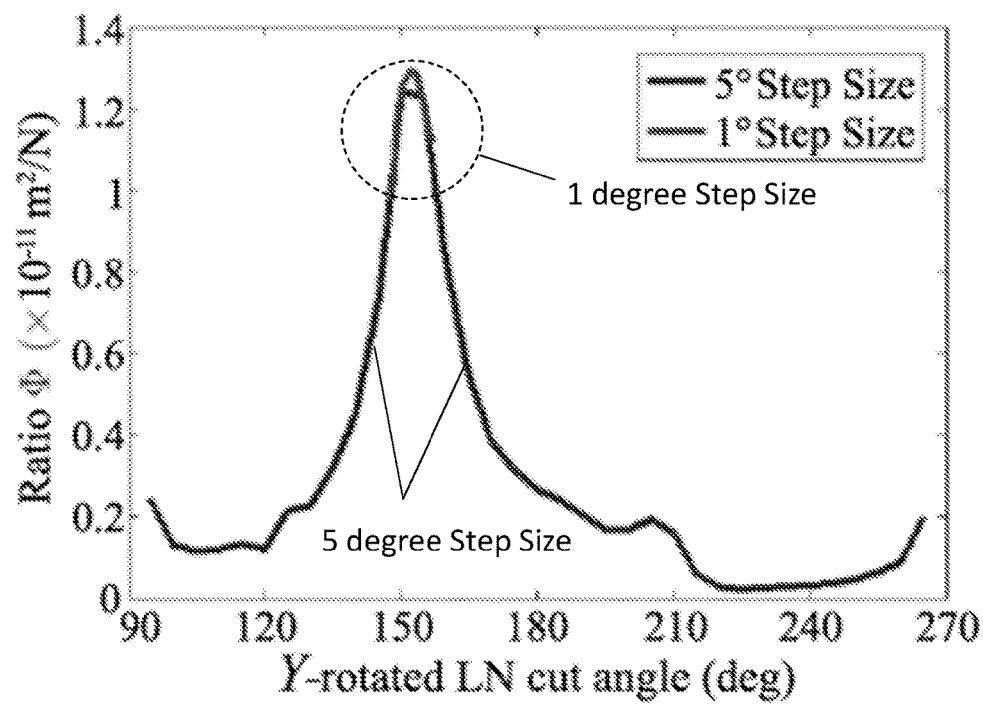
FIG. 10 depicts a graph showing a comparison of a ratio and a Y-rotated LN cut angle, consistent with implementations of the current subject matter.

FIG. 10 further illustrates the improvement of the substrate 106, such as the piezoelectric material including a 152YX LN cut over the 128YX LN cut (among other cuts of LN) in propagating SAWs in multiple directions and/or along multiple axes. For example, FIG. 10 illustrates the relationship between a ratio, Φ, of the in-plane averaged coupling coefficient over all possible SAW propagation directions to the Euclidean norm of an in-plane stiffness tensor between the Y-cut LN and an isotropic material, given by $\Phi = K_\alpha^2 / L_2$, with respect to θ+90°, the Y-rotated cut angle of LN. As shown in FIG. 10, the maximum value for Φ occurs at θ+90°=152 degrees, indicating that the 152YX cut (or Y-rotated cut angles of approximately 140 degrees to 145 degrees, 140 degrees to 150 degrees, 145 degrees to 150 degrees, 150 degrees to 155 degrees, 155 degrees to 160 degrees, 160 degrees to 165 degrees, 145 degrees to 155 degrees, 151 degrees to 153 degrees, 151.5 degrees to 152.5 degrees,) optimally minimizes planar anisotropy and maximizes planar electromechanical coupling in multi-directional SAW propagation applications, such use of the OSSAW device 102 described herein. Accordingly, the OSSAW device 102, including the transducer 104 and/or the substrate 106 described herein efficiently and effectively separates particles from a fluid by propagating SAWs in multiple directions towards the fluid.

Figure 2:
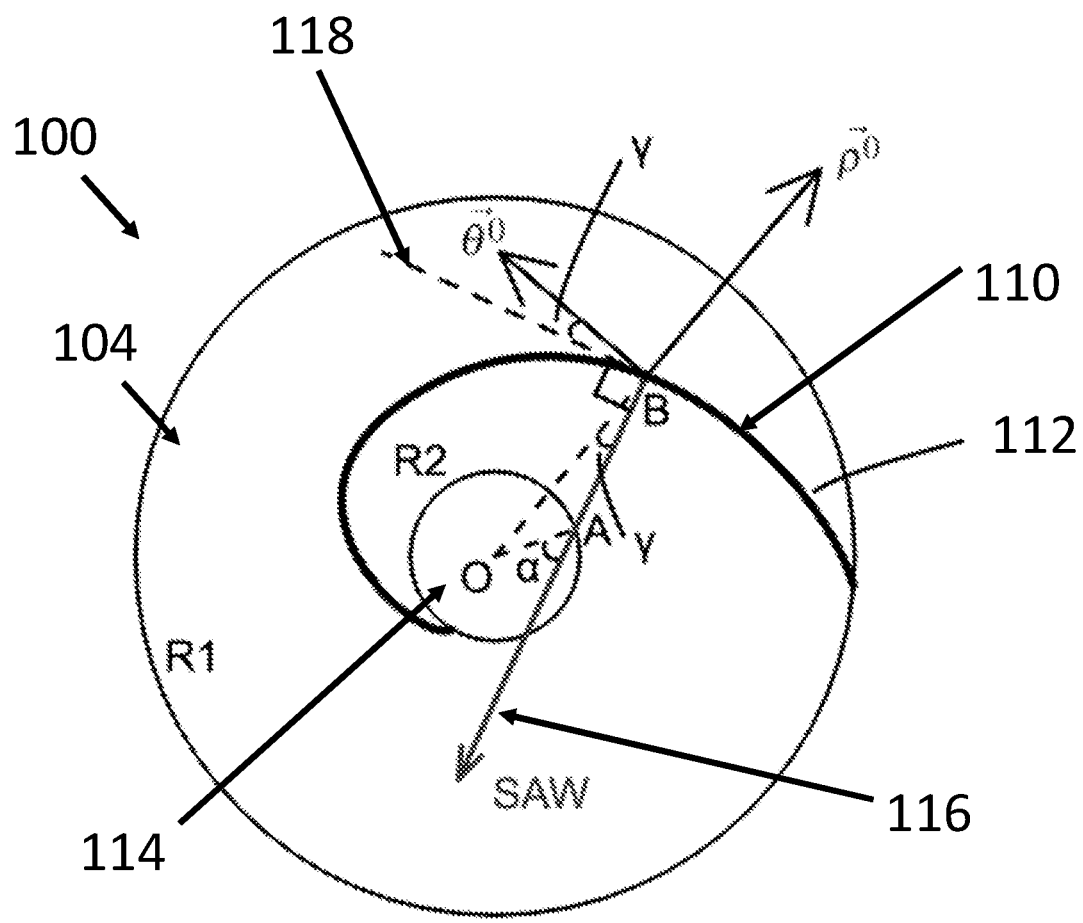
FIG. 2 schematically depicts an example of a spiral formation of a surface acoustic wave device, consistent with implementations of the current subject matter.
Figure 3:
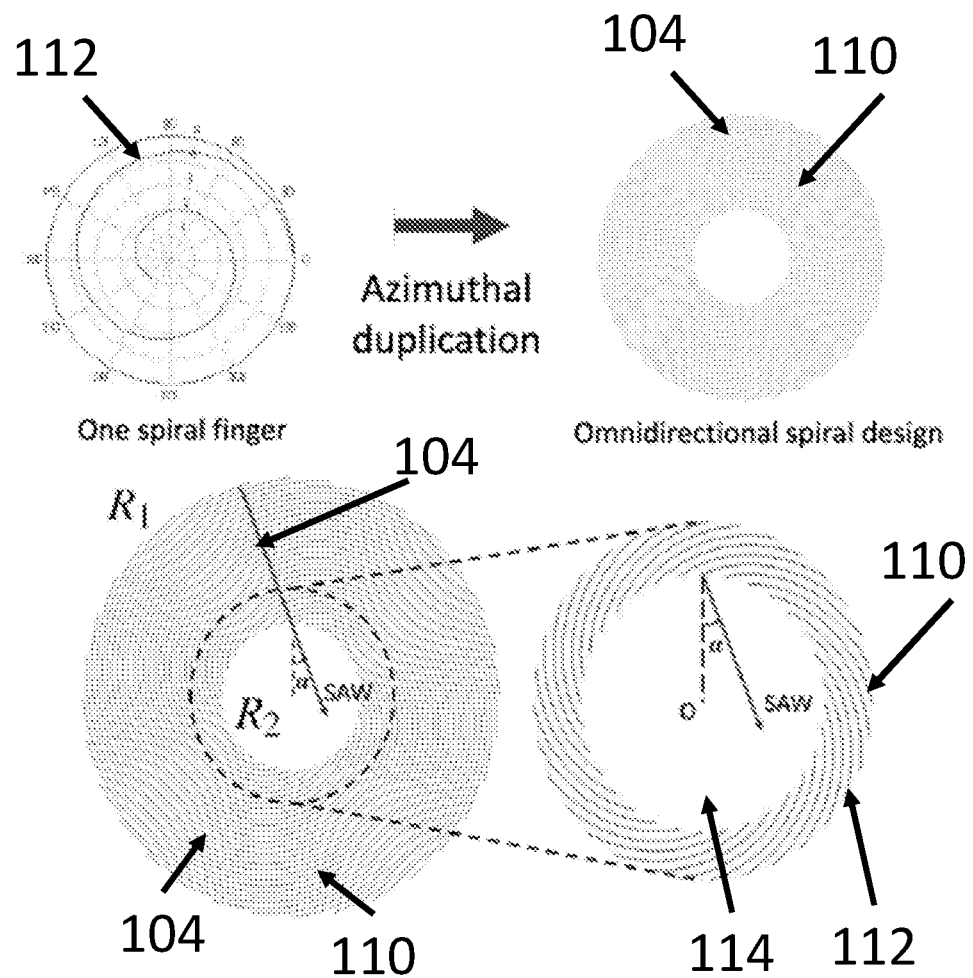
FIG. 3 schematically depicts a spiral formation of a surface acoustic wave device, consistent with implementations of the current subject matter.

Referring back to FIG. 1, the OSSAW device 102 includes a transducer 104 coupled to the substrate 106. FIG. 2 schematically illustrates an example of the spiral formation 110 of the transducer 104, consistent with implementations of the current subject matter. FIG. 3 also schematically depicts an example of the spiral formation 110 of the transducer 104, consistent with implementations of the current subject matter. As shown in FIGS. 2 and 3, the spiral formation 110 includes one or more electrodes or fingers 112. The one or more fingers 112 may be arranged in a spiral configuration. For example, the one or more fingers 112 may include one or more finger pairs, one or more arrays of fingers 112, and/or a plurality of fingers 112 that are positioned adjacent to one another. The one or more fingers 112 may be curved, have a spiral shape, and/or may be spaced apart from one another. The one or more fingers 112 may extend from a periphery of the spiral formation 110 towards and/or around a portion of a center of the spiral formation 110. The plurality of fingers may connect to a central point in a central region 114 of the spiral formation 110 such that the fluid 101 is placed directly over at least a portion of the plurality of fingers 112, such as the portion of the plurality of fingers at the central point and/or positioned within the central region 114.

A plurality of adjacent fingers 112 may face a single direction (e.g., an inner facing side and/or an outer facing side of each finger faces the same direction) and may be positioned spaced apart from one another to define the spiral formation 110 in a clockwise and/or a counter-clockwise direction, depending on the direction of the fingers 112. Additionally, and/or alternatively, each of the fingers (e.g., each of the curved fingers) of the plurality of fingers may include internal reflectors to suppress and reflect acoustic waves from propagating outwards from the spiral formation 110. Additionally and/or alternatively, each of the fingers of the plurality of fingers face two or more directions to permit formation of fluid rotation in either direction depending on frequency, to facilitate poloidal fluid motion by quickly switching back and forth between these directions, and to drive more complex fluid flow by switching between the directions in a predetermined pattern of time and input power.

In some implementations, electrical energy is converted to mechanical energy across pairs of fingers 112 and/or adjacent fingers 112 to generate the SAWs. Adjacent fingers 112 may be spaced apart by a gap. The widths of the finger 112 and/or the gaps between adjacent fingers 112 are defined by the wavelength of the desired acoustic wave. In this example, the desired wavelength is ¼λ, and thus the gap between adjacent fingers 112 is also ¼λ. In other implementations, the desired wavelength is ⅛λ, ⅜λ, ½λ, ⅝λ, ¾λ, ⅞ λ and/or other ranges there between, and thus, the gap between adjacent fingers 112 and/or the width of the fingers 112 is also /8λ, ⅜λ, ½λ, ⅝λ, ¾λ, ⅞λ and/or other ranges there between. In some implementations, the plurality of fingers 112 may narrow down to sub-micrometer widths and operate at gigahertz frequencies coupling into the fluid 101, which in some implementations is placed directly over the plurality of fingers 112.

The spiral formation 110 is configured to generate SAWs in all directions towards a central region 114 of the spiral formation 110. Thus, the spiral formation 110 generates the SAWs in one or more directions that are tangent to the central region 114 and/or the fluid 101 deposited on the substrate 106, rather than in the same direction as the fluid 101. This helps to more efficiently and effectively separate and/or isolate fluid components from within the fluid 101. Additionally and/or alternatively, this configuration helps to minimize the anisotropic properties of the substrate 106 and maximize the piezoelectric coupling to more effectively target the SAWs to the fluid 101 for fluid component separation and isolation. In some implementations, the plurality of fingers 112 are covered with a thin layer of a non-conductive material to prevent short-circuiting of the transducer while enabling direct coupling into the fluid. In some implementations, the fluid 101 may be placed directly over the plurality of fingers 112, such as over the non-conductive material layer and/or over a central portion of the transducer 104 (e.g., at or over the central portion 114).

In some implementations, the spiral formation 110 includes one or more reflectors and/or spiral finger patterns. The reflectors and/or spiral finger patterns may allow for the acoustic waves generated by the transducer 104 to be spun in both a clockwise and a counter-clockwise direction. For example, the reflectors and/or spiral finger patterns may cause the spiral formation 110 to include a first plurality of fingers 112 facing a first direction and a second plurality of fingers 112 facing a second direction. The transducer 104 may generate acoustic waves that are spun in a counter-clockwise and/or a clockwise direction at different frequencies to more effectively separate multi-sized particles. For example, the acoustic waves spun in a first direction (e.g., counter-clockwise direction) at a desired frequency (e.g., 80 MHz) may better isolate smaller particles from the fluid 101, while the acoustic waves spun in an opposite direction (e.g., clockwise direction) at a desired frequency (e.g., 40 MHz) may better isolate larger particles from the fluid 101. Spinning the acoustic waves in certain directions may also help to push certain types and/or sizes of particles to the periphery and/or towards the center of the fluid droplet for extraction. The transducer 104 consistent with implementations of the current subject matter may generate acoustic waves spun in alternating directions (e.g., clockwise to counter-clockwise and/or counter-clockwise to clockwise) to isolate particular particles and/or to more effectively separate particles having multiple sizes.

FIGS. 2 and 3 schematically illustrate an omnidirectional spiral formation including a circular array of spiral fingers 112. For example, FIGS. 2 and 3 schematically depict an example of a finger 112. The finger 112 extends from a periphery of the spiral formation in a spiral and/or curved shape towards the central region 114 of the spiral formation 110, where the fluid is configured to be positioned. As shown in FIG. 2, for example, the transducer 104 generates a SAW 116 that is propagated in a direction that is perpendicular to the tangent 118 of the spiral finger 112.

In some implementations, the transducer 104 generates and/or propagates a SAW at any point along the spiral formation 110 of the transducer 104 along a constant offset angle relative to its radial direction, α, into the central (e.g., circular) region 114. To generate the spiral formation 110 of the OSSAW device 102, the following spiral equation (1) in polar coordinates (ρ, θ) may be used:

$$\theta = \sqrt{A\rho^2 - 1} - \tan^{-1}\left(\sqrt{A\rho^2 - 1}\right) - \sqrt{AR_1^2 - 1} + \tan^{-1}\left(\sqrt{AR_1^2 - 1}\right) \quad \text{Equation(1)}$$

where:

$$A = \frac{1}{(R_2^2 \sin^2 \alpha)}$$

$R_1$ and $R_2$ are outer and inner radii of the spiral formation 110, and a is the offset angle for SAW propagation.

As shown in FIG. 2 and, the omnidirectional spiral design is obtained by applying an azimuthal duplication to produce a complete set of fingers 112 from one single spiral finger 112. The number of duplications in the spiral formation 110 may be determined by an equality between the finger width, the gap between adjacent fingers 112, and the size of the wavelength (e.g., ¼λ, as described above). For example, the below equations (2) and (3) may be used to determine the number of duplications of each finger 112 to form the spiral formation 110 of the transducer 104.

$$R_2 \frac{2\pi}{n} \sin\alpha = \frac{\lambda}{4} = \frac{v}{4f} \quad \text{Equation(2)}$$

where: $R_2$ is the inner radius of the spiral formation 110 of the transducer 104, $n/2$ is the number of spiral fingers 112, $\alpha$ is the offset angle for SAW propagation, $\lambda$ is the wavelength of the SAW, $f$ is the frequency of the SAW, and $v$ is the phase velocity of the SAW propagating on the substrate 106. Equation (2) may simplify to:

$$n = \frac{8\pi f R_2 \sin\alpha}{v} \qquad \text{Equation(3)}$$

where the number of spiral fingers 112 $n$ are dependent on the wave frequency $f$, the radius of the inner circle of the spiral $R_2$, SAW offset angle $\alpha$, and SAW phase velocity $v$.

As described in more detail herein, the in-plane anisotropy of the substrate 106 (e.g., including a piezoelectric material) does not need to be considered in determining the spiral formation 110. For example, a particular type of substrate 106 may be used, such as the 152YX LN (or Y-rotated cut angles of approximately 140 degrees to 145 degrees, 140 degrees to 150 degrees, 145 degrees to 150 degrees, 150 degrees to 155 degrees, 155 degrees to 160 degrees, 160 degrees to 165 degrees, 145 degrees to 155 degrees, 151 degrees to 153 degrees, 151.5 degrees to 152.5 degrees,) may be used together with the transducer 104 to minimize in-plane anisotropy and maximize electromechanical coupling for OSSAW propagation. Unlike the 128YX LN cut substrate, which exhibits poor electromechanical coupling of acoustic waves away from single X-axis, the OSSAW device 102 (including the spiral formation 110 and/or the substrate 106) described herein generates a more intense acoustic streaming and acoustic radiation force by exploiting the electromechanical coupling from all propagation directions towards the fluid (e.g., the fluid 101).

Figure 4:
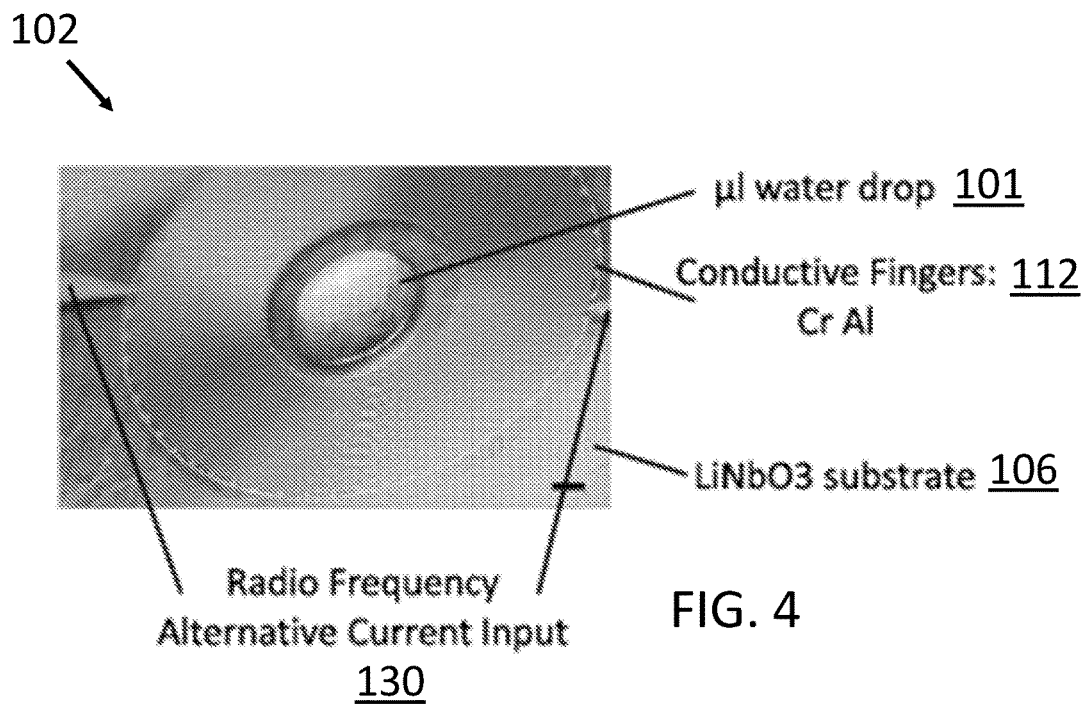
FIG. 4 depicts an example of a surface acoustic wave device, consistent with implementations of the current subject matter.

FIG. 4 illustrates another example of the OSSAW device 102, including the substrate 106 and the transducer 104, surrounding a fluid 101 (e.g., a microliter sessile drop) positioned within the central region 114 of the spiral formation 110. As shown in FIG. 4, the transducer 104 may receive power, such as a sinusoidal electric field, via an input 130, such as a radio frequency alternative current input, signal generator, and/or the like. The input 130 may be coupled to the transducer 104 at at least two locations on the transducer 104, such as on opposing sides of the transducer 104. Upon receipt of the power via the input 130, the OSSAW device 102 (e.g., the transducer 104) may generate SAWs. In the example OSSAW device 102 shown in FIG. 4, $\lambda$ is equal to 60 µm, $f$=67 MHz. The fingers 112 of the spiral formation 110 include finger pairs with finger and gap width of $\lambda/4$.

Figures 5A, 5B:
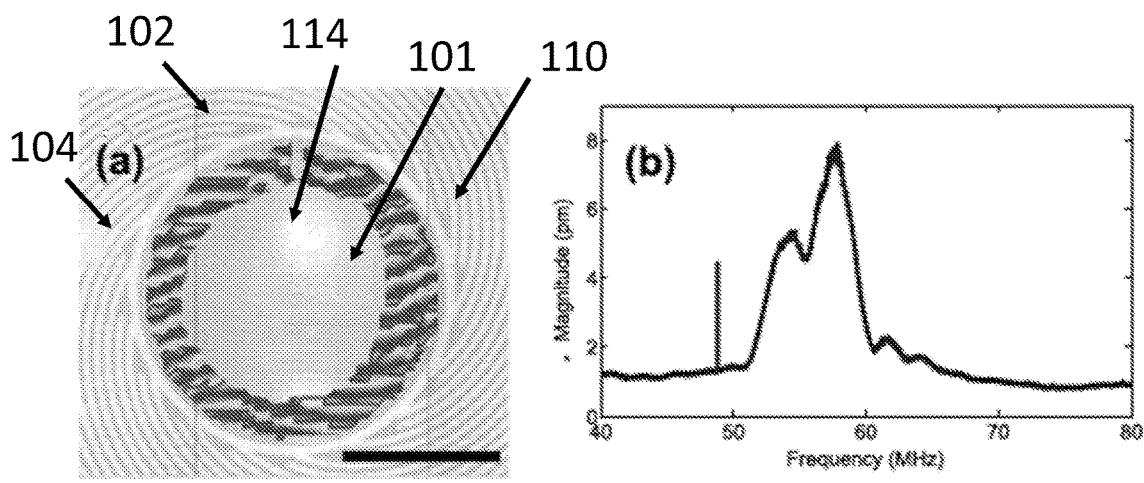
FIG. 5A depicts a laser Doppler vibrometer phase scan of a surface acoustic wave device, consistent with implementations of the current subject matter.
FIG. 5B depicts a graph illustrating an average wave magnitude of a scanned region of a surface acoustic wave device and an applied wave frequency, consistent with implementations of the current subject matter.

FIG. 5A illustrates a laser Doppler vibrometer (LDV) phase scan of the OSSAW (OSSAW device 102) central region 114, showing rotational SAWs propagating into the central region 114. This illustrates an example of the wave pattern present around a microliter droplet present on the OSSAW device 102. FIG. 5B illustrates a graphical relationship between the average wave magnitude of the scanned region of the OSSAW device 102 and the applied wave frequency, indicating that the resonance of the SAW device occurs at approximately 57 MHz, and demonstrating the circular rotational SAW in the central region of the OSSAW device 102.

Figures 6A, 6B:
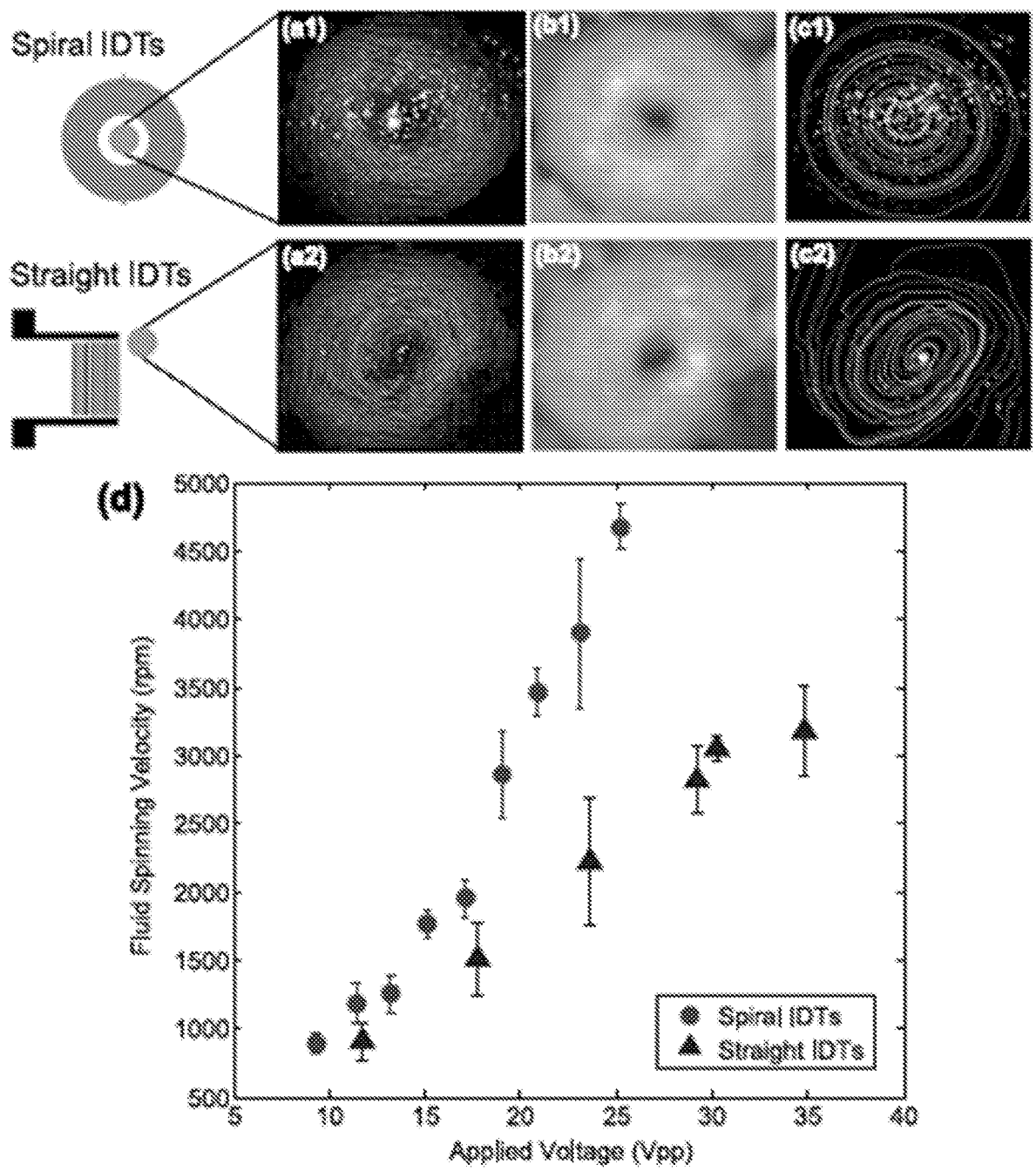
FIG. 6A depicts a comparison between a spiral transducer of a surface acoustic wave device and a straight transducer, consistent with implementations of the current subject matter.
FIG. 6B depicts a graph illustrating the spiral transducer of the surface acoustic wave device and the straight transducer, consistent with implementations of the current subject matter.

FIG. 6A illustrates the superiority of the liquid spinning phenomenon caused by acoustic streaming effects from the OSSAW device 102 described herein and the liquid spinning results from a straight IDT. FIG. 6B graphically illustrates this comparison as the relationship between rotations of the contents of the fluid deposited on the OSSAW device and the applied power on the OSSAW device. As shown in FIG. 6A, for example, the acoustic streaming pattern generated by the OSSAW device 102 described herein is more axisymmetric than the acoustic streaming pattern generated by the straight IDT. Additionally, as shown in FIG. 6B, the OSSAW device 102 produces a greater rotation speed (up to approximately 4000 to 4600 RPM) than the straight IDT, at the same (or reduced) applied voltage. As a result, the OSSAW device 102 produces more rapid and efficient spinning of the liquid, while at the same time requiring the same or less power input, which in turn more efficiently and effectively separates particles from the fluid than the straight IDT.

As described herein, the OSSAW device 102 may effectively separate multi-sized particles and/or blood components from within the fluid 101 deposited on the OSSAW device 102. Additionally and/or alternatively, the OSSAW device 102 beneficially concentrates different sized components at particular locations within the fluid droplet. For example, the OSSAW device 102 concentrates larger components of the fluid 101 having a larger radius towards the center of the fluid droplet and concentrates smaller components of the fluid 101 having a smaller radius towards the periphery of the fluid droplet. The spiral formation 110 of the OSSAW device 102 generates this phenomenon, as it generates an acoustic radiation force and a centrifugal force when the OSSAW device 102 propagates the SAWs toward the fluid droplet and spins the fluid droplet. When the components of the fluid have a larger radius, the generated acoustic radiation force is greater than the generated centrifugal force, causing the larger particles to concentrate towards the center of the fluid droplet. Additionally and/or alternatively, when the components of the fluid have a smaller radius, the generated acoustic radiation force is less than the generated centrifugal force, causing the smaller particles to concentrate towards the periphery of the fluid droplet. This allows for easier and quicker analysis and extraction of the desired components of the fluid droplet. In addition to quicker separation of particles from within the targeted fluid, the OSSAW device 102 separates particles into known locations, such as over one or more of the holes 108, for easier extraction.

For example, FIGS. 7A-7D demonstrate the improved ability of the OSSAW device 102 in isolating particles and/or blood cells from a fluid. FIG. 7A illustrates an example of a fluid droplet 101, such as water, that includes multi-sized particles 101A (e.g., multi-size polystyrene particles) having a diameter of 1 µm, 5 µm, and 43 µm. In this case, after applying approximately 1 W via the input to the OSSAW device 102 for approximately one second, the particles 101A separated and concentrated at different locations within the fluid droplet 101 due to the acoustic radiation force and centrifugal force generated by the spinning of the fluid. As shown in FIG. 7B, the smallest particles 101A collected at the periphery of the fluid droplet, the intermediate-sized particles 101A collected as an annular ring in the fluid droplet, and the largest particles collected at the center of the fluid droplet. As described herein, the separated particles 101A may then be extracted via the extraction system 150. Thus, the OSSAW device 102 described herein effectively separate multi-sized particles from within the fluid droplets, and positions various sized particles at different locations within the droplet for easier analysis and extraction.

Similarly, the OSSAW device 102 effectively separates particular blood cells from a blood droplet. For example, FIG. 7C illustrates an example of a fluid droplet 101, such as a whole blood droplet. In this case, after applying approximately 1 W via the input to the OSSAW device 102 for approximately 5 seconds, individual blood cells 101B were separated from the remaining whole blood droplet. As shown in FIG. 7D, the larger blood components (e.g., red blood cells) are concentrated towards the center of the blood droplet, while smaller blood components (e.g., platelets) are concentrated in the middle of the blood droplet, and smaller blood components are concentrated at the periphery of the blood droplet. As described herein, particular blood components 101B may then be extracted via the extraction system 150. Thus, the OSSAW device 102 described herein effectively separate multi-sized blood components from within the blood droplets, and positions various sized blood components at different locations within the droplet for easier analysis and extraction.

FIGS. 8A and 8B further illustrate the effectiveness of the OSSAW device 102, consistent with implementations of the current subject matter. For example, FIG. 8A shows a fluid (e.g., a water droplet) including multiple sized particles (e.g., a 1 μm and a 5 μm particle) before separation, after separation of the particles 101A from the fluid 101, and after extraction of the separated particles 101A, such as via the extraction system 150 through the hole 108. As shown, after separation, the larger particles are located towards the center of the fluid droplet and the smaller particles are located towards the periphery of the fluid droplet. As another example, FIG. 8B shows a fluid (e.g., a blood droplet) including red blood cells before separation, after separation of the blood cells 101B from the fluid 101, and after extraction of the separated blood cells 101B, such as via the extraction system 150 through the hole 108.

Figure 11:
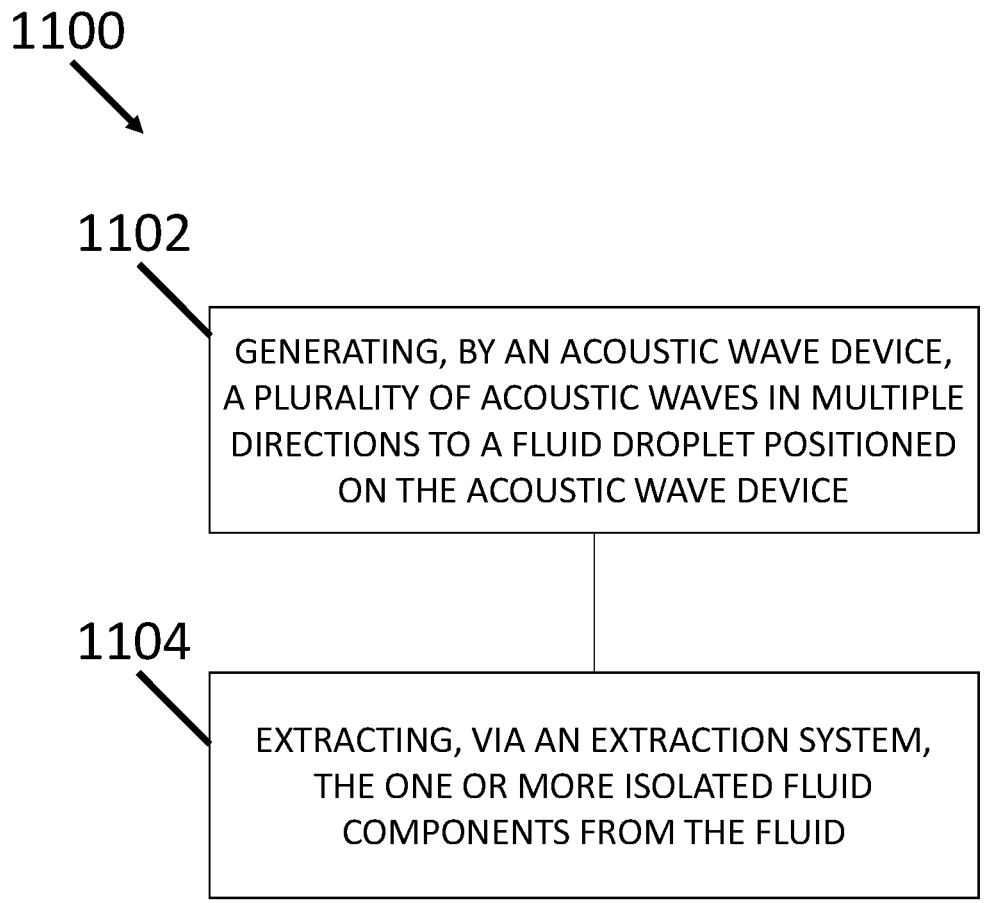
FIG. 11 depicts a flowchart illustrating a process for omnidirectional spiral surface acoustic wave generation, in accordance with some example embodiments.

FIG. 11 depicts a flowchart illustrating a process 1100 for acoustic wave generation, in accordance with some example embodiments. Referring to FIGS. 1-10, the process 1100 may be performed by the SAW system 100.

At 1102, the SAW system 100, such as the OSSAW device 102, may generate and propagate a plurality of acoustic waves in multiple directions to a fluid droplet positioned on the SAW device. The fluid droplet may include one or more fluid components, such as one or more particles (of the same or different sizes) and/or one or more blood components (e.g., blood platelets, blood cells, and/or the like). For example, the OSSAW device 102 may generate the plurality of acoustic waves, which may be delivered to the fluid droplet. The acoustic waves may isolate the one or more fluid components within the fluid droplets. Isolating the one or more fluid components may including positioning the one or more fluid components over one or more holes 108 in the substrate 106 of the OSSAW device 102.

At 1104, the SAW system 100, such as the extractor system 150, may extract the one or more isolated fluid components from the fluid droplet. For example, the one or more isolated fluid components may be extracted through the hole 108 in the substrate for analysis. In some implementations, the one or more isolated fluid components may be extracted through the hole 108 in the substrate 106 via capillary action and/or physical manipulation of an extractor.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. An acoustic wave device configured to generate a plurality of acoustic waves, the acoustic wave device comprising:
   a substrate comprising lithium niobate configured to convert electric energy into the plurality of acoustic waves, the substrate configured with a Y-rotated cut angle of between about 140 degrees and about 160 degrees; and
   a transducer coupled to the substrate, the transducer comprising a plurality of fingers arranged in a spiral formation;
   wherein the plurality of acoustic waves is configured to induce acoustic streaming along the substrate in multiple directions to isolate a fluid component within a fluid located on the acoustic wave device.

2. The acoustic wave device of claim 1, wherein the acoustic wave device propagates the plurality of acoustic waves in a direction that is perpendicular to a tangent of each finger of the plurality of fingers.

3. The acoustic wave device of claim 1, wherein the spiral formation comprises a circular array of the plurality of fingers.

4. The acoustic wave device of claim 1, wherein the Y-rotated cut angle is between about 151.5 degrees and about 152.5 degrees.

5. The acoustic wave device of claim 1, wherein each of the fingers of the plurality of fingers are curved from a periphery towards a central region of the transducer.

6. The acoustic wave device of claim 1, wherein each of the fingers of the plurality of fingers face a single direction.

7. The acoustic wave device of claim 1, wherein the transducer comprises an interdigital transducer such that the plurality of fingers of the spiral formation of the transducer are interdigitated.

8. The acoustic wave device of claim 1, wherein the substrate comprises a hole through which the isolated fluid component is configured to be extracted via an extraction system coupled to the acoustic wave device, the extraction system comprising an extractor and a capillary tube.

9. The acoustic wave device of claim 1, wherein the fluid component comprises one or more of a particle, a platelet, and a blood cell.

10. The acoustic wave device of claim 1, wherein 50 milliwatts to 5.0 watts of electric power is applied to the substrate in order to cause the acoustic wave device to generate the plurality of acoustic waves.

11. The acoustic wave device of claim 1, wherein the fluid component comprises a large fluid component and a small fluid component, wherein the plurality of acoustic waves is configured to cause the large fluid component to be located towards a center of the fluid and the small fluid component to be located towards a periphery of the fluid.

12. The acoustic wave device of claim 11, wherein the small fluid component and/or the large fluid component comprises one or more of a suspension of fluid and a colloid.

13. A method, comprising:
generating, by an acoustic wave device, a plurality of acoustic waves in multiple directions to a fluid droplet positioned on the acoustic wave device, the acoustic wave device comprising:
- a substrate comprising lithium niobate configured to convert electric energy into the plurality of acoustic waves, the substrate configured with a Y-rotated cut angle of between about 140 degrees and about 160 degrees; and
- a transducer coupled to the substrate, the transducer comprising a plurality of fingers arranged in a spiral formation;

wherein the plurality of acoustic waves is configured to induce acoustic streaming along the substrate in multiple directions to isolate a fluid component within a fluid on acoustic wave device.

14. The method of claim 13, further comprising propagating the plurality of acoustic waves in a direction that is perpendicular to a tangent of each finger of the plurality of fingers.

15. The method of claim 13, wherein the spiral formation comprises a circular array of the plurality of fingers.

16. The method of claim 13, further comprising: extracting, via an extractor system, the isolated fluid component from the fluid.

17. The method of claim 16, wherein the substrate comprises a hole beneath the fluid; and wherein the extracting further comprises: extracting, through the hole, the fluid component.

18. The method of claim 16, wherein the extractor system comprises a syringe and a capillary tube to draw the isolated fluid component.

* * * * *